US012061096B2

(12) United States Patent
Dormody et al.

(10) Patent No.: US 12,061,096 B2
(45) Date of Patent: Aug. 13, 2024

(54) BAROMETRIC PRESSURE SENSOR CALIBRATION BASED ON ACTIVITY CONTEXT

(71) Applicant: NextNav, LLC, Sunnyvale, CA (US)

(72) Inventors: Michael Dormody, San Jose, CA (US); Badrinath Nagarajan, South San Francisco, CA (US); Arun Raghupathy, Bangalore (IN); Guiyuan Han, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 205 days.

(21) Appl. No.: 17/443,281

(22) Filed: Jul. 23, 2021

(65) Prior Publication Data
US 2023/0028950 A1   Jan. 26, 2023

(51) Int. Cl.
*G01C 25/00*   (2006.01)
*G01C 5/06*   (2006.01)

(52) U.S. Cl.
CPC .............. *G01C 25/00* (2013.01); *G01C 5/06* (2013.01)

(58) Field of Classification Search
CPC .................................. G01C 25/00; G01C 5/06
See application file for complete search history.

(56) References Cited

U.S. PATENT DOCUMENTS

| | | | |
|---|---|---|---|
| 9,163,946 B2 | 10/2015 | Chowdhary et al. | |
| 9,618,337 B2 | 4/2017 | Chun et al. | |
| 10,477,358 B1* | 11/2019 | Dormody | H04W 4/029 |
| 2013/0245986 A1* | 9/2013 | Grokop | G01P 13/00 |
| | | | 702/141 |
| 2015/0156725 A1* | 6/2015 | Basir | G01P 15/02 |
| | | | 455/574 |
| 2015/0247917 A1 | 9/2015 | Gum et al. | |
| 2015/0300823 A1* | 10/2015 | Kahn | G01C 21/20 |
| | | | 701/411 |
| 2016/0106368 A1* | 4/2016 | Wu | G01P 13/00 |
| | | | 702/50 |

(Continued)

FOREIGN PATENT DOCUMENTS

WO    2019226225 A1    11/2019

OTHER PUBLICATIONS

Sankaran et al., Using Mobile Phone Barometer for Low-Power Transportation Context Detection, 2014, Proceedings of the 12th ACM Conference on Embedded Network Sensor Systems, pp. 191-205. (Year: 2014).*

(Continued)

*Primary Examiner* — Lina Cordero
*Assistant Examiner* — Lyudmila Zaykova-Feldman
(74) *Attorney, Agent, or Firm* — MLO, a professional corp.

(57) ABSTRACT

A wholistic activity context is used to determine whether to calibrate a barometric pressure sensor of a mobile device. A pair of activity transitions are determined from three activities of the mobile device. A time relationship and a position relationship between the activity transitions is determined. An opportunity to calibrate the barometric pressure sensor occurs between the activity transitions. A calibration of the barometric pressure sensor is performed in response to determining that the time relationship and the position relationship indicate that the wholistic activity context surrounding the opportunity to calibrate the barometric pressure sensor is conducive to calibration.

26 Claims, 7 Drawing Sheets

(56) References Cited

U.S. PATENT DOCUMENTS

| | | | |
|---|---|---|---|
| 2016/0245716 A1* | 8/2016 | Gum | G01L 27/002 |
| 2017/0195984 A1 | 7/2017 | Dormody et al. | |
| 2018/0252521 A1 | 9/2018 | Dormody et al. | |
| 2018/0255431 A1* | 9/2018 | Robertson | G01C 5/06 |
| 2020/0370887 A1* | 11/2020 | Wu | G01C 5/06 |
| 2021/0156685 A1 | 5/2021 | Nagarajan et al. | |

OTHER PUBLICATIONS

Vanini et al., Using barometric pressure data to recognize vertical displacement activities on smartphones, 2016, Computer Communications 87, pp. 37-48. (Year: 2016).*

Manivannan et al., On the Challenges and Potential of Using Barometric Sensors to Track Human Activity, 2020, Sensors, 20, 6786 (Year: 2020).*

Gu et al., User-Independent Motion State Recognition Using Smartphone Sensors, 2015, Sensors, 15(12), 30636-30652 (Year: 2015).*

International Search Report and Written Opinion dated Oct. 20, 2022 for PCT Patent Application No. PCT/IB2022/056772.

* cited by examiner

Fig. 4 ← 400

| Activity Transition Pair | Time difference | Position difference | Activity between transition pairs | Conclusion conducive to calibration? |
|---|---|---|---|---|
| DS to SD | small | small | Stopped in traffic | No |
| | large | | Parked | Yes |
| DW to WD | small | small | In slow traffic | No |
| | large | | Parked or looking for parking, driving again | Yes/No |
| DS to SW | small | small | Arrived at destination, walking around | Yes |
| | large | | Parked, walking around | Yes |
| DW to WS | small | small | Parked or looking for parking | Yes/No |
| | large | | Looking for parking (slow driving) | No |
| DS to SD / DW to WD / DS to SW / DW to WS | small | large | Impossible. Position unreliable and/or activity unreliable | No |
| SD to DS / WD to DW / SD to DW / WD to DS | small | small | Started driving and stopped driving | No |
| | large | small | Driving in circles, making loops around a building structure | No |
| | small | large | Driving | No |
| DS to SD / DW to WD / DS to SW / DW to WS SD to DS / WD to DW / SD to DW / WD to DS | large | large | No conclusion to draw as data is too sparse | No |
| SW to WS / WS to SW | Small or large | Small or large | Does not include driving | Yes |

BAROMETRIC PRESSURE SENSOR CALIBRATION BASED ON ACTIVITY CONTEXT

BACKGROUND

Some mobile devices are part of systems that determine altitude of the mobile devices based on barometric pressure. In a barometric-based location determination system, altitude of the mobile device is calculated using a calibrated barometric pressure sensor and correcting for the weather effects using ambient pressure and temperature measurements obtained from a calibrated network of sensors deployed at known locations near the mobile device. Such systems necessarily rely on a well-calibrated barometric pressure sensor within the mobile device. Unfortunately, most consumer-grade barometric pressure sensors are inexpensive sensors that may not be well-calibrated. Furthermore, even if the barometric pressure sensor is accurately calibrated at one time, the calibration may drift over time, thereby eventually becoming poorly calibrated and rendering the altitude determination capabilities of the mobile device inaccurate, unreliable, or useless. Therefore, it is necessary for the mobile device to communicate with a system with which to calibrate its barometric pressure sensor. This calibration is most desired when it is accomplished automatically, i.e., without the user's intervention or knowledge.

The accuracy of the calibrations by such a calibration system may be questionable if the activity of the user and the mobile device at the time that data is obtained is not conducive to performing a calibration. For example, if the mobile device is moving rapidly (e.g., when traveling in a vehicle) or is within an enclosed environment with artificially altered air pressure (e.g., inside a vehicle or building, among other situations), then measurements (e.g., horizontal 2D position and air pressure) taken by the mobile device for the purpose of calibrating its barometric pressure sensor might be unreliable or inaccurate. A conventional straightforward determination of the activity of the mobile device, can also be inaccurate, because some of the measurements (e.g., location and acceleration) used to determine activity can be misleading.

SUMMARY

In some embodiments, systems and methods that look at a wholistic activity context to determine whether to calibrate a barometric pressure sensor determine a first activity, a second activity, and a third activity of a mobile device; determine a first activity transition of the mobile device based on the first activity and the second activity; determine a second activity transition of the mobile device based on the second activity and the third activity; determine a transition pair based on the first activity transition and the second activity transition; determine a time relationship and a position relationship for the transition pair between the first activity transition and the second activity transition; determine that an opportunity to calibrate a barometric pressure sensor of the mobile device has occurred at a timepoint between the first activity transition and the second activity transition based on the plurality of data packets; perform a calibration of the barometric pressure sensor in response to determining that the time relationship and the position relationship for the transition pair indicate that an activity context of the mobile device for the timepoint of the opportunity to calibrate the barometric pressure sensor is conducive to calibration; do not perform the calibration of the barometric pressure sensor in response to determining that the time relationship and the position relationship for the transition pair indicate that the activity context of the mobile device for the timepoint of the opportunity to calibrate the barometric pressure sensor is not conducive to calibration; and obtain a current calibration value for calibrating the barometric pressure sensor in response to performing the calibration.

In some embodiments, the activity context of the mobile device for the timepoint of the opportunity to calibrate the barometric pressure sensor is determined not to be conducive to calibration in response to determining 1) the first activity transition is from a first driving activity to a still activity, 2) the second activity transition is from the still activity to a second driving activity, and 3) the time relationship indicates that a time difference between the first activity transition and the second activity transition is less than a time threshold. In some embodiments, the activity context of the mobile device for the timepoint of the opportunity to calibrate the barometric pressure sensor is determined to be conducive to calibration in response to determining 1) the first activity transition is from a first driving activity to a still activity, 2) the second activity transition is from the still activity to a second driving activity, 3) the time relationship indicates that a time difference between the first activity transition and the second activity transition is greater than a time threshold, and 4) the position relationship indicates that a position difference between the first activity transition and the second activity transition is less than a distance threshold. In some embodiments, the activity context of the mobile device for the timepoint of the opportunity to calibrate the barometric pressure sensor is determined not to be conducive to calibration in response to determining 1) the first activity transition is from a first driving activity to a walking activity, 2) the second activity transition is from the walking activity to a second driving activity, and 3) the time relationship indicates that a time difference between the first activity transition and the second activity transition is less than a time threshold. In some embodiments, the activity context of the mobile device for the timepoint of the opportunity to calibrate the barometric pressure sensor is determined to be conducive to calibration in response to determining 1) the first activity transition is from a first driving activity to a walking activity, 2) the second activity transition is from the walking activity to a second driving activity, 3) the time relationship indicates that a time difference between the first activity transition and the second activity transition is greater than a time threshold, and 4) the position relationship indicates that a position difference between the first activity transition and the second activity transition is less than a distance threshold. In some embodiments, the activity context of the mobile device for the timepoint of the opportunity to calibrate the barometric pressure sensor is determined not to be conducive to calibration in response to determining 1) the first activity transition is from a first driving activity to a walking activity, 2) the second activity transition is from the walking activity to a second driving activity, 3) the time relationship indicates that a time difference between the first activity transition and the second activity transition is greater than a time threshold, and 4) the position relationship indicates that a position difference between the first activity transition and the second activity transition is less than a distance threshold. In some embodiments, the activity context of the mobile device for the timepoint of the opportunity to calibrate the barometric pressure sensor is determined to be conducive to calibration in response to determining 1) the first activity transition is from a driving activity to a still activity, 2) the second activity transition is from the still activity to a walking activity, and 3) the position relationship indicates that a position difference between the first activity transition and the second activity transition is less than a distance threshold. In some embodiments, the activity context of the mobile device for the timepoint of the opportunity to calibrate the barometric pressure sensor is determined not to be conducive to calibration in response to determining 1) the first activity transition is from a driving activity to a still activity, 2) the second activity transition is from the still activity to a walking activity, and 3) the position relationship indicates that a position difference between the first activity transition and the second activity transition is greater than a distance threshold. In some embodiments, the activity context of the mobile device for the timepoint of the opportunity to calibrate the barometric pressure sensor is determined to be conducive to calibration in response to determining 1) the first activity transition is from a driving activity to a walking activity, 2) the second activity transition is from the walking activity to a still activity, 3) the time relationship indicates that a time difference between the first activity transition and the second activity transition is less than a time threshold, and 4) the position relationship indicates that a position difference between the first activity transition and the second activity transition is less than a distance threshold. In some embodiments, the activity context of the mobile device for the timepoint of the opportunity to calibrate the barometric pressure sensor is determined not to be conducive to calibration in response to determining 1) the first activity transition is from a driving activity to a walking activity, 2) the second activity transition is from the walking activity to a still activity, 3) the time relationship indicates that a time difference between the first activity transition and the second activity transition is less than a time threshold, and 4) the position relationship indicates that a position difference between the first activity transition and the second activity transition is less than a distance threshold. In some embodiments, the activity context of the mobile device for the timepoint of the opportunity to calibrate the barometric pressure sensor is determined not to be conducive to calibration in response to determining 1) the first activity transition is from a driving activity to a walking activity, 2) the second activity transition is from the walking activity to a still activity, 3) the time relationship indicates that a time difference between the first activity transition and the second activity transition is greater than a time threshold, and 4) the position relationship indicates that a position difference between the first activity transition and the second activity transition is less than a distance threshold. In some embodiments, the activity context of the mobile device for the timepoint of the opportunity to calibrate the barometric pressure sensor is determined not to be conducive to calibration in response to determining 1) the first activity transition is from a driving activity to a walking activity, 2) the second activity transition is from the walking activity to a still activity, 3) and the position relationship indicates that a position difference between the first activity transition and the second activity transition is greater than a distance threshold. In some embodiments, the activity context of the mobile device for the timepoint of the opportunity to calibrate the barometric pressure sensor is determined not to be conducive to calibration in response to determining 1) the first activity transition is from any first activity to a driving activity, and 2) the second activity transition is from the driving activity to any second activity. In some embodiments, the activity context of the mobile device for the timepoint of the opportunity to calibrate the barometric pressure sensor is determined not to be conducive to calibration in response to determining 1) the first activity transition is from any first activity to any second activity, 2) the second activity transition is from the second activity to any third activity, and 3) the position relationship indicates that a position difference between the first activity transition and the second activity transition is greater than a distance threshold.

BRIEF DESCRIPTION OF THE DRAWINGS

FIG. 4 is a simplified table of rules for determining whether an activity context is conducive to calibrating a barometric pressure sensor in a mobile device, in accordance with some embodiments.

DETAILED DESCRIPTION

Figure 1:
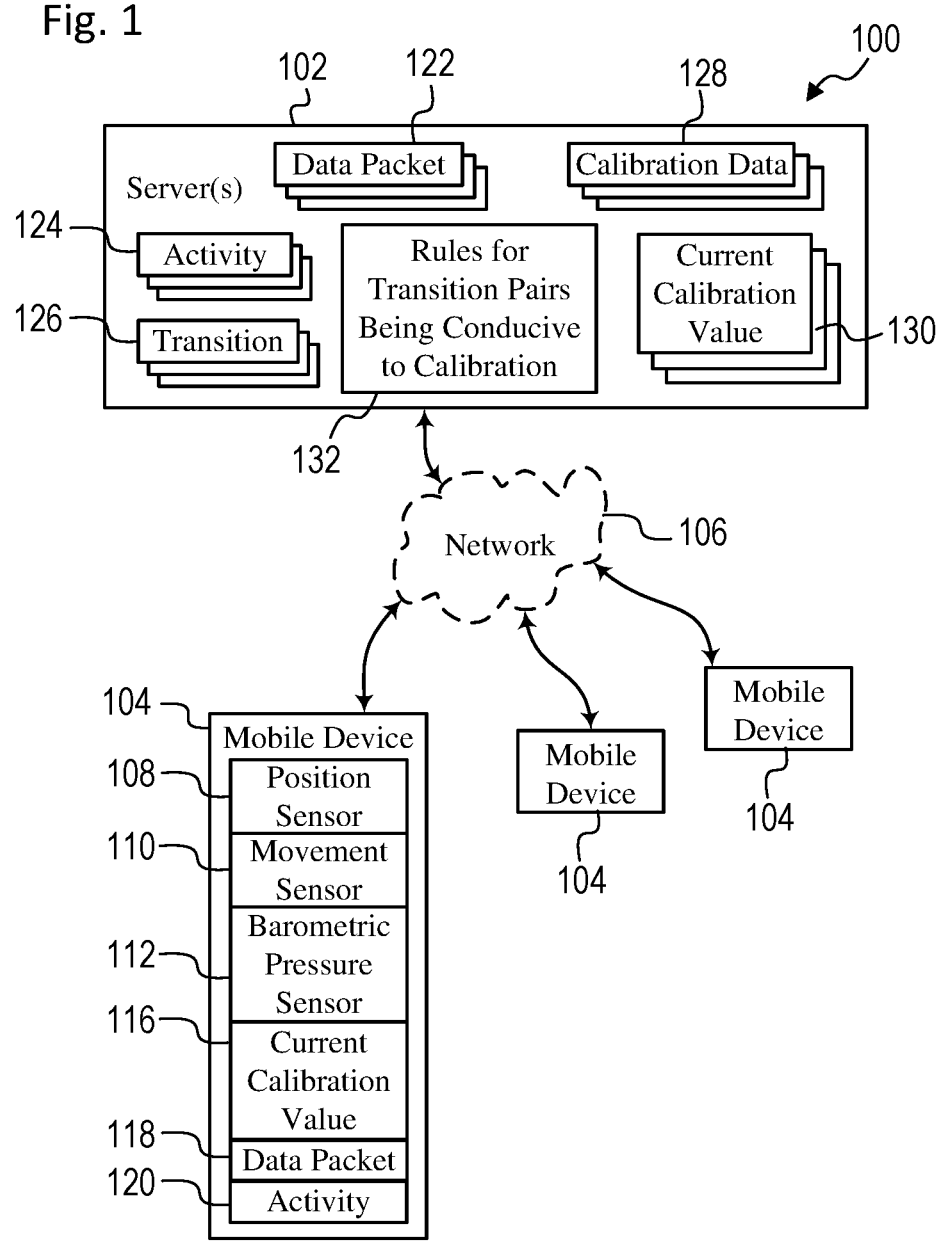
FIG. 1 is a simplified schematic diagram of an example calibration system for determining whether to calibrate a barometric pressure sensor in a mobile device, in accordance with some embodiments.

A calibration system or method described herein mitigates the potential problems of situations that might not be conducive to calibration of a barometric pressure sensor in a mobile device by determining a likely activity of the mobile device, i.e., an "activity status" of the mobile device at a time when an opportunity for calibration occurs. The likely activity of the mobile device is based on the context of the activity within a series of other preceding and/or subsequent activities. In particular, the calibration system determines the "activity context" based on pairs of sequential activity transitions. If the activity context indicates that the activity status of the mobile device is likely to be conducive to calibration at a timepoint when an opportunity to calibrate the barometric pressure sensor occurs, then the calibration system performs the calibration (or flags the calibration-related data as "good to calibrate", for calibration at a later time). Otherwise, if the activity context does not indicate that the activity status is likely to be conducive to calibration, the calibration is not performed (or the calibration-related data is not flagged as "good to calibrate"). In this manner, the calibration system or method described herein filters out potentially poor calibration opportunities or prevents potentially poor calibrations from being performed to a greater extent than is possible by a conventional system that simply attempts to determine whether to perform a calibration based only on a current activity of the mobile device.

In an example calibration technique in accordance with some embodiments, the calibration system monitors data from the mobile device for an opportunity when the mobile device is at a known location for which the altitude is known. Then the calibration system looks up the known location's altitude in a database of known locations and uses this altitude to adjust the calibration parameters for the barometric pressure sensor in the mobile device such that the calculated barometric-based altitude matches the known location's altitude. Known locations can be provided by a set of surveyed locations, a terrain database, a series of waypoints, etc. In an example scenario for this calibration technique, data for calibrating the barometric pressure sensor is collected by the mobile device while the mobile device is outside (i.e., not within an enclosed space), since there are typically a diverse set of opportunities to calibrate to a known location within an area of variable terrain. (Having a diverse set of calibration opportunities can improve calibration accuracy and precision, since several calibration results can be obtained, and a "best" or mean result can be selected.) However, the user and the mobile device may technically be considered "outside" even when driving or riding in a vehicle. An enclosed environment of a vehicle, however, may not be conducive to calibration due to the Venturi effect surrounding the vehicle while travelling at high speeds or due to artificial pressurization from the vehicle's HVAC system. In this situation, therefore, if the mobile device were to encounter an opportunity for calibration, the result of the calibration technique could be unreliable or inaccurate. Additionally, despite a mobile device's ability to report its activity (using sensor information), such as a "driving" activity, a "biking" activity, a "walking" activity, a "still" activity, etc., the reported activity may be misleading since it is a result of only a single snapshot in time of the mobile device's activity which cannot capture the complete activity, rather than the result of arising out of a complete, overall or wholistic activity context. For example, a mobile device in a vehicle that is stopped at a traffic light would identify its activity as "still", despite being part of the overall context of a driving trip, wherein a measured barometric pressure could potentially be affected by the vehicle's HVAC system. The wholistic activity context, thus, helps to determine the then-current activity status of the user and mobile device at the time that the opportunity for calibration occurs.

The disclosure herein describes systems and methods to identify wholistic activities, or activity context, with regard to typical mobile device movement, and also to identify which activity contexts are conducive to barometric pressure sensor calibration or to identify which activity contexts are indicative of the activity status being conducive to barometric pressure sensor calibration.

FIG. 1 is a simplified schematic diagram of an example calibration system 100 for calibrating a barometric pressure sensor in a user's mobile device, in accordance with some embodiments. In some embodiments, the calibration system 100 generally includes a server 102 and several user devices or mobile devices 104. The server 102 generally communicates with the mobile devices 104 through a network 106.

The server 102 generally represents one or more computerized devices, such as a cloud computing system, a server farm, a set of computers, a desktop computer, a notebook computer, among others. The mobile devices 104 each generally represent a mobile phone, smart phone, a cell phone, other wireless communication device, a handheld computer, a notebook computer, a personal computer, a portable computer, a navigation device, a tracking device, a receiver, etc. The network 106 generally represents any appropriate combination of the Internet, cell phone communication systems, broadband cellular networks, wide area networks (WANs), local area networks (LANs), wireless networks, networks based on the IEEE 802.11 family of standards (Wi-Fi networks), and other data communication networks.

In some embodiments, each mobile device 104 generally includes a position sensor 108, a movement sensor 110, a barometric pressure sensor 112, a current calibration value 116 (having a calibration amount and a calibration confidence interval), a data packet 118, and activity data 120, among other hardware, software and data. The position sensor 108 generally represents one or more appropriate sensor devices and associated software for detecting a position of the mobile device 104, such as for a Global Navigation Satellite System (GNSS, such as GPS, GLONASS, Galileo, Compass/Beidou), a terrestrial transmitter system, or a hybrid satellite/terrestrial system, among others. The movement sensor 110 generally represents one or more appropriate sensor devices and associated software for detecting movement of the mobile device 104, such as an accelerometer, a gyroscope, a magnetometer/compass, and/or a pedometer, among others.

The barometric pressure sensor 112 represents any appropriate sensor device that generates an atmospheric pressure measurement with which the mobile device 104 determines its altitude. The current calibration value 116 is used by the mobile device 104 or the barometric pressure sensor 112 to calibrate the barometric pressure sensor 112, i.e., to adjust the raw pressure measurement to obtain a more accurate adjusted pressure measurement with which to determine the altitude. The data packet 118 contains calibration data that the mobile device 104 gathers for sending to the server 102 for the server 102 to determine an opportunity to calibrate the mobile device 104 and to generate the current calibration value 116 for the mobile device 104. The data packet 118 also contains time, location and activity data that the mobile device 104 gathers for sending to the server 102 for the server 102 to determine whether a timepoint of an opportunity to calibrate the barometric pressure sensor is conducive to calibration. The activity data 120 generally represents data gathered and/or generated by the mobile device 104 to determine its activity.

In some embodiments, the server 102 generally contains data packets 122 (corresponding to the data packets 118), activity data 124 (corresponding to the activity data 120), transition data 126 (whether derived by the server 102 or received from the mobile device 104), calibration data 128, a current calibration value 130, and rules for transition pairs being conducive to calibration (i.e., calibration rules 132), among other hardware, software and data. The server 102 generally maintains the data packets 122, the activity data 124, the transition data 126, the calibration data 128, and the current calibration value 130 for each mobile device 104. The activity data 124, the transition data 126, and the calibration data 128 are generally received by the server 102 from each of the mobile devices 104 as data in the data packets 122 or are calculated by the server 102 from the data in the data packets 122. The calibration rules 132 generally represent a set of rules (described below) for determining whether sequential pairs of activity transitions (based on the activity data 124 and the transition data 126) are indicative of a timepoint therebetween being conducive to performing a calibration of the barometric pressure sensor 112 of the mobile device 104 from which the data was received.

The calibration data 128 generally represents data that is used by the server 102 to generate or calculate the current calibration value 130 for each mobile device 104. Thus, for each mobile device 104, the calibration data 128 generally includes data that is received by the server 102 from the mobile device 104 in the data packets 122 therefrom, received by the server 102 from other sources, and/or generated by the server 102 from the received data. For each mobile device 104, the server 102 maintains one or more sets of the calibration data 128 and/or data packets 122 that contain recent unexpired calibration data. The server 102 may delete data packets or calibration data that is old or expired and considered either no longer relevant or no longer reliable.

Therefore, the server 102 uses the data in the data packets 122 for one of the mobile devices 104 to determine whether an opportunity for calibrating the barometric pressure sensor 112 of the mobile device 104 has occurred. (Alternatively, the mobile device 104 uses this data, along with the calibration rules 132, to determine whether an opportunity for calibrating its barometric pressure sensor 112 has occurred and sends the result to the server 102 in the data packet 118.) When a calibration opportunity is determined to have occurred, the server 102 then determines whether the activity context surrounding the timepoint of the calibration opportunity is conducive to calibration, as described below. If so, then with the calibration data 128 for the mobile device 104, the server 102 performs one or more of a variety of calibration techniques with which to determine the current calibration value 130 for the mobile device 104. The current calibration value 130 is then sent to the mobile device 104 for calibrating the barometric pressure sensor 112 therein.

Figure 2:
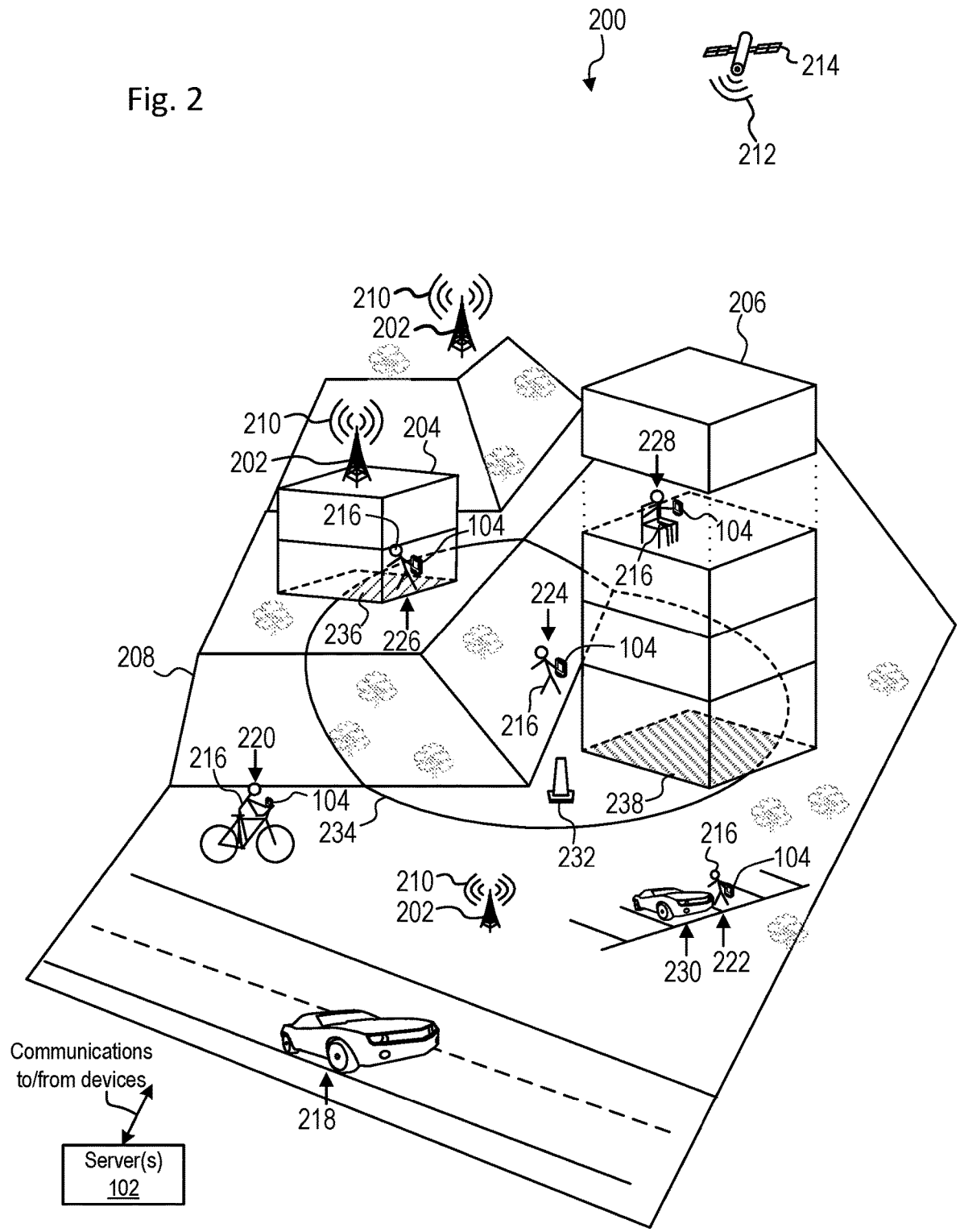
FIG. 2 is a simplified environment in which a mobile device can be used and a barometric pressure sensor in the mobile device can be calibrated, in accordance with some embodiments.
Figure 9:
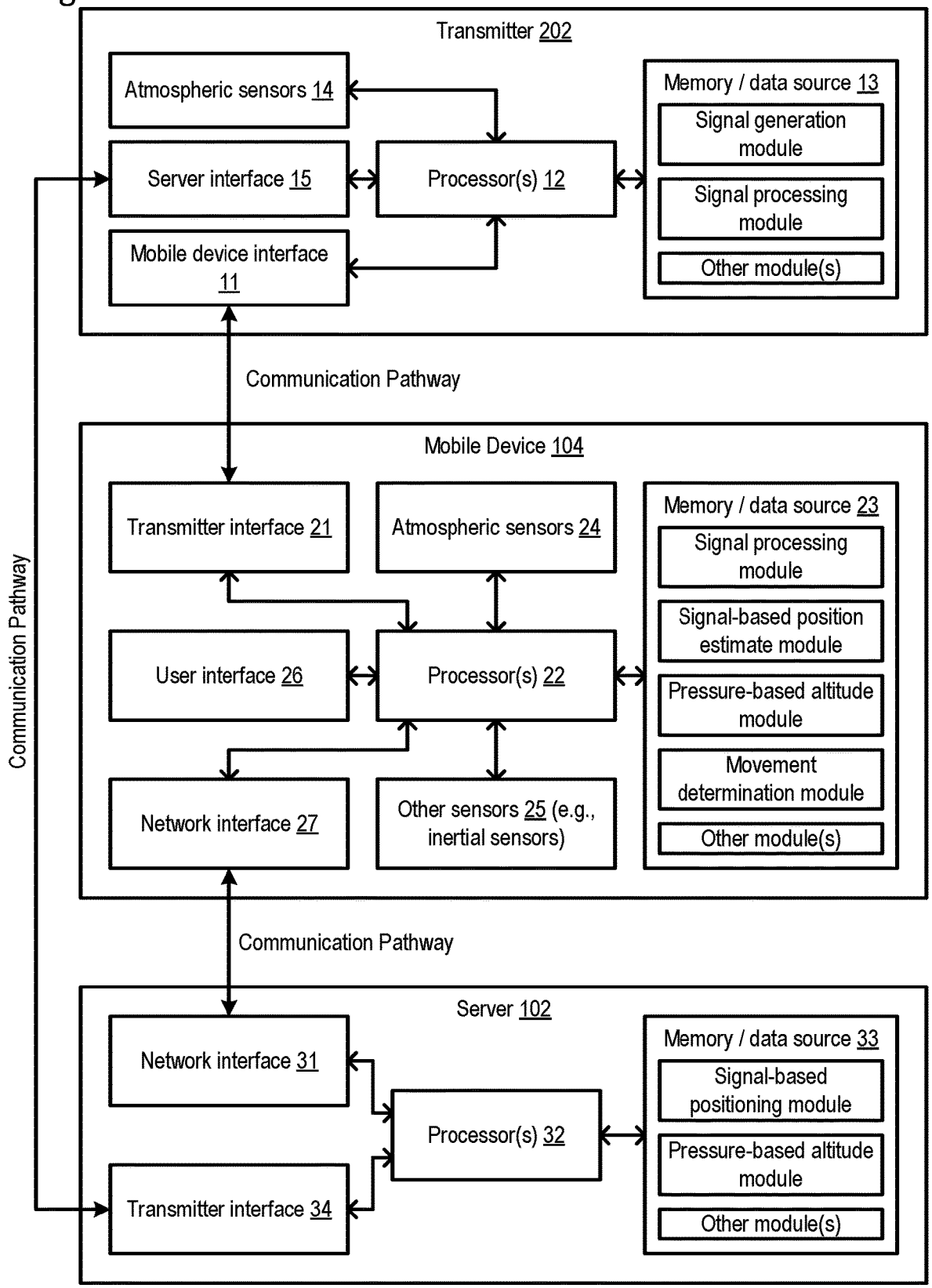
FIG. 9 shows simplified schematic diagrams of a transmitter, a mobile device, and a server, in accordance with some embodiments.

FIG. 2 shows a simplified example environment 200 in which the mobile devices 104 can be used and the barometric pressure sensors 112 therein can be calibrated, in accordance with some embodiments. The environment 200 includes a network of terrestrial transmitters 202, at least one of the mobile devices 104, and the server 102. The server 102 exchanges communications with various devices, such as the mobile device 104. Each of the transmitters 202 and the mobile device 104 may be located at different altitudes or depths that are inside or outside various natural or manmade structures (e.g., buildings 204 and 206), relative to different elevations throughout a terrain 208, as illustrated by examples in FIG. 2. Positioning signals 210 and 212 are transmitted from the transmitters 202 and satellites 214, respectively, and are subsequently received by the mobile device 104 using known transmission technologies. For example, the transmitters 202 may transmit the signals 210 using one or more common multiplexing parameters that utilize time slots, pseudorandom sequences, frequency offsets, or other approaches, as is known in the art or otherwise disclosed herein. Examples of possible hardware, software and data components in the transmitters 202, the mobile device 104, and the server 102 are shown in FIGS. 1 and 9, as described herein. In particular, each transmitter 202 and mobile device 104 may include atmospheric sensors (e.g., barometric pressure sensors and temperature sensors, as appropriate) for generating measurements of atmospheric conditions (e.g., atmospheric pressure and temperature) that are used to estimate an unknown altitude of the mobile device 104 or to calibrate the barometric pressure sensor 112 therein.

As a person/user 216 with the mobile device 104 moves throughout such an example environment 200, the mobile device 104 may experience a variety of activities. For example, the mobile device 104 may be moving rapidly (e.g., location changes significantly in a relatively short time) when it is in a vehicle (as at 218) that the user is driving (or riding in). In another example, the mobile device 104 may be moving somewhat rapidly (e.g., slower than is typical for driving, but faster than is typical for walking or running) when the user 216 is riding a bicycle (as at 220). In another example, when the user 216 is walking or running (as at 222, 224 or 226), the mobile device 104 may be moving somewhat slowly (relative to driving or biking) or movement data from the accelerometer indicates steps by the user while the barometric pressure data is not changing significantly. In another example, the mobile device 104 may be still (e.g., the movement data from the accelerometer is stable) when the user 216 is simply standing or sitting (as at 228) or parked in a vehicle (as at 230). Other possible activities may include running, roller skating, skateboarding, skiing, swimming, etc. Thus, although the embodiments described herein use only the driving, walking and still activities, it is understood that other embodiments can use any appropriate combination of determinable activities.

An activity experienced by the user 216 and the mobile device 104 can generally be determined with a reasonable level of accuracy or certainty for most purposes based on position and movement data from the position sensor 108 and movement sensor 110 along with timestamp data associated with the times at which measurements were taken when generating the position and movement data. Either the mobile device 104 can use conventional techniques to determine the activity and send the activity data 120 to the server 102 for the server 102 to use as the activity data 124; or the mobile device 104 can send the position, movement and timestamp data to the server 102 for the server 102 to use conventional techniques to determine the activity data 124.

During some of these activities, the mobile device 104 may encounter one or more opportunities to calibrate its barometric pressure sensor 112. In some embodiments, the mobile device 104 sends time, location and pressure data to the server 102 for the server to determine when a calibration opportunity has occurred and to perform various calibration techniques. The mobile device 104 generally sends this data in the data packets 118 to the server 102 at regular time intervals, when prompted by the server 102, or when the mobile device 104 detects a calibration opportunity. (In other embodiments, the mobile device 104 determines when a calibration opportunity has occurred and performs the calibration techniques by obtaining relevant data from the server 102.)

In an example, when location data generated by the mobile device 104 indicates that the mobile device 104 is within a threshold distance of a known location 232, such as a monument or a survey marker, for which the altitude has been well-established and is thus known, then an opportunity has occurred to perform a calibration technique based on the known location 232. The calibration result in this example is generally based on the known altitude of the known location 232, any known or estimated altitude variation in the terrain surrounding the known location 232 and the mobile device 104, pressure measurements from the barometric pressure sensor 112 of the mobile device 104, and pressure and temperature measurements generated by the nearest transmitters 202. In another example, when the location data generated by the mobile device 104 indicates that the mobile device 104 is within a location area 234 (i.e., a mobile device footprint) that encompasses an area of terrain for which a range of altitude is known or can be estimated, then an opportunity has occurred to perform a calibration technique using data for the terrain. Additionally, if the location area 234 overlaps with a structure, such as the buildings 204 and 206 as indicated by the shaded areas 236 and 238, then the calibration technique may use building and terrain data. The calibration result in this example is generally based on a known or estimated average altitude of the terrain within the location area 234, any known or estimated altitude variation in the terrain within the location area 234, a known or estimated number and height of floors of the buildings 204 and 206, pressure measurements from the barometric pressure sensor 112 of the mobile device 104, and pressure and temperature measurements generated by the nearest transmitters 202. Other examples of techniques for calibrating a barometric pressure sensor in a mobile device within an overall calibration system are provided in U.S. Pat. No. 10,514,258 B2, filed Aug. 31, 2017, titled "Systems and Methods for Calibrating Unstable Sensors", U.S. Patent Publication 2019/0360886 A1, filed Mar. 26, 2019, titled "Systems and Methods for Determining When to Calibrate a Pressure Sensor of a Mobile Device", U.S. Patent Publication 2020/0116483 A1, filed May 7, 2019, titled "Systems and Methods for Pressure-Based Estimation of a Mobile Device Altitude or Calibration of a Pressure Sensor"; and U.S. patent application Ser. No. 17/303,691, filed Jun. 4, 2021, titled "Constraining Barometric Pressure Sensor Calibration with Sporadic Data Collection", which are incorporated as if fully set forth herein. These disclosures describe example calibration techniques, and when the data in the data packet 122 from the mobile device 104 indicates that one or more of these calibration techniques can be performed, then an opportunity has occurred to calibrate the barometric pressure sensor 112 for the mobile device 104, and the server 102 detects the occurrence of a calibration opportunity based on the data in the data packets 122.

Figure 3:
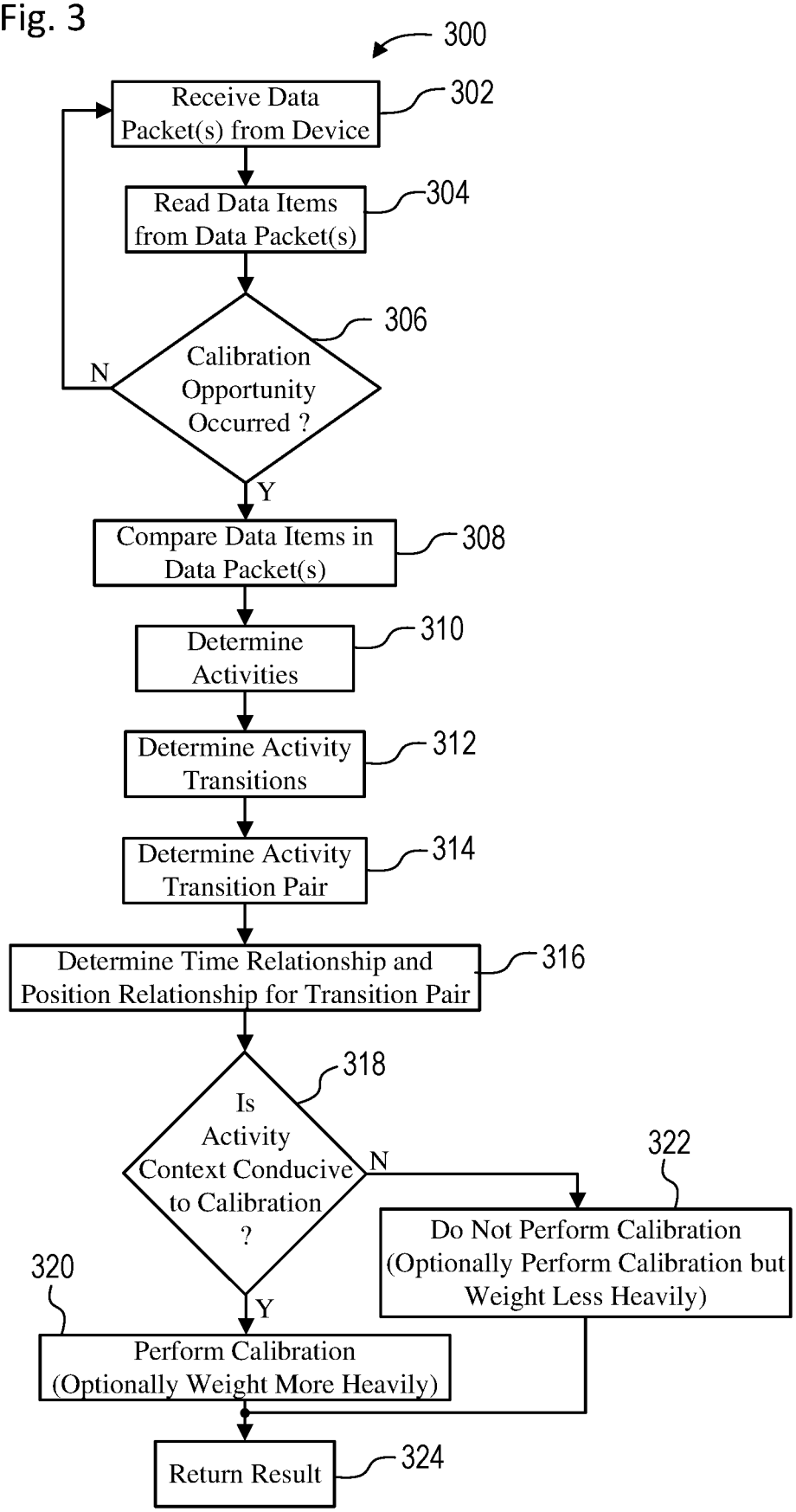
FIG. 3 is a simplified flowchart for an example process for determining whether an activity context is conducive to calibrating a barometric pressure sensor in a mobile device, in accordance with some embodiments.

FIG. 3 shows a simplified flowchart for an example process 300 for determining whether an activity context surrounding a calibration opportunity is conducive to calibrating the barometric pressure sensor 112 of the mobile device 104, in accordance with some embodiments. The particular steps, combination of steps, and order of the steps for this process are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps. Furthermore, although the example process 300 is described as being performed by the server 102, it is understood that in some embodiments some or all of the steps of the process 300 can be performed by the mobile device 104, instead, when the mobile device 104 generates or receives the necessary data.

At 302, the server 102 receives and stores one or more data packets 122 (at one or more times) from the mobile device 104. (The receipt of any data packet 122 generally triggers performance of the example process 300.) The server 102 reads (at 304) the data items from the data packets 122. Based on the data items in the data packets 122 and additional data used with any of the calibration techniques, the server 102 determines (at 306) whether a calibration opportunity has occurred. (For example, based on the location data in the data packets 122 and a database of known locations, the server 102 can determine whether the mobile device 104 has been within a threshold distance of the known location 232 and, thereby, further determine that an opportunity has occurred to perform a "known location" calibration technique.) When a calibration opportunity has not yet occurred, as determined at 306, the process 300 returns to 302 for the server 102 to wait for a next data packet 122. However, when the server 102 determines (at 306) that a calibration opportunity has occurred the process 300 continues to 308.

When the server 102 determines (at 306) that a calibration opportunity has occurred, the server 102 further determines the activity context (at 308-316) surrounding the time of the calibration opportunity in order to determine whether to perform the calibration technique indicated by the data packets 122. The activity context, i.e., wholistic activity, is based not only on the current activity of the user 216 and the mobile device 104 at the time that the calibration opportunity occurred, but also on the immediately preceding activity and the immediately following activity (and time and position data), as described below. Thus, the server 102 does not begin the calibration technique immediately upon determining that the calibration opportunity has occurred, but delays performing the calibration technique until the server 102 determines first, second and third activities of the mobile device 104 based on the immediately preceding activity, the current activity, and the immediately following activity, respectively. Thus, the server 102 waits for one or more subsequent data packets 122 after determining (at 306) that a calibration opportunity has occurred.

Therefore, after receiving subsequent additional data packets 122, the server 102 compares (at 308) the data items in several of the most recent data packets 122 to determine (at 310) the activities for the activity data 124 of the mobile device 104 surrounding the timepoint at which the calibration opportunity occurred, i.e., the previous, current and following (first, second and third) activities associated with the calibration opportunity. The activity data 124 is generally based on time, position and movement data in the data packets 122. In some embodiments, however, the mobile device 104 determines its activities for its activity data 120, in which case 308 is performed by the mobile device 104 (e.g., by a processor or a sensor hub in the mobile device 104), which then sends the activity data 120 to the server 102 in the data packets 118 for storage as the activity data 124 from the data packets 122. The server 102 then determines (at 310) the activities for the activity data 124 of the mobile device 104 by reading the activity data 124 from the data packets 122.

At 312, the server 102 (or the mobile device 104) determines a first activity transition based on the first activity and the second activity and determines a second activity transition based on the second activity and the third activity. If the mobile device 104 updates its activity data 120 every T seconds (e.g., T may be 30 seconds or other appropriate time period), and if the server 102 receives the activity data 124 promptly, then the server 102 can potentially determine a new activity transition every T seconds. However, it is likely that the activity will not always change with each update, so the activity transitions are determined when the activity changes to something different than what it was before, which will typically happen at a multiple of T seconds. In some embodiments, the activity data is updated on-the-fly, so an activity transition can occur at almost any time.

At 314, the server 102 determines a transition pair based on the first activity transition and the second activity transition. For example, if the first activity is "driving", the second activity is "still", and the third activity is "walking", then the first activity transition is a "driving-to-still" transition, the second activity transition is a "still-to-walking" transition, and the transition pair is a "driving-to-still-and-still-to-walking" transition pair. Other transition pairs include a "driving-to-walking-and-walking-to-driving" transition pair, a "driving-to-still-and-still-to-walking" transition pair, a "driving-to-walking-and-walking-to-still" transition pair, among others. Some embodiments may use a subset of the possible transition pairs.

Activities are designated herein by their initials, e.g., "D" for a driving activity, "W" for a walking activity, and "S" for a still activity. Thus, the "driving-to-still" transition is designated "DS", the "still-to-walking" transition is designated "SW". As a result, the "driving-to-still-and-still-to-walking" transition pair is designated "DS to SW".

At 316, the server 102 determines a time relationship and a position relationship for the transition pair. The time relationship is generally the length of time between the timepoint when the first activity transition occurred and the timepoint when the second activity transition occurred. The position relationship is generally the distance between the location at which the first activity transition occurred and the location at which the second activity transition occurred. For example, if the first activity transition is determined to occur at time t1 and position p1, and the second activity transition is determined to occur at time t2 and position p2, then the time difference for the time relationship is calculated as t2−t1, and the positional difference for the position relationship is calculated as the Euclidean distance between p1 and p2. Positions p1 and p2 can be 2D positions or 3D positions, for example. Additionally, since each activity transition is determined based on two activities that occur at timepoints that are T seconds apart, it is understood that the transition could have occurred at any point within those T seconds, so the timepoint for the activity transition may be determined to occur, for example, at the timepoint of the first activity, the timepoint of the second activity, or the timepoint of the midpoint therebetween. Similarly, since each activity transition is determined based on two activities that occur at locations that may be some distance apart, it is understood that the transition could have occurred at any point between those two locations, so the location for the activity transition may be determined to occur, for example, at the location of the first activity, the location of the second activity, or the location of the midpoint therebetween. Similarly, since the transition pair is based on three activities, each occurring at a received timepoint (with the middle activity occurring at one or more received timepoints), the calibration opportunity can occur at the received timepoint of the first activity, any received timepoint of the second activity, the received timepoint of the third activity, or at any timepoint between the received timepoints. However, one of the received timepoints of the second activity (or any timepoint in between) is preferable for the calibration opportunity.

At 318, the server 102 (or the mobile device 104) determines whether the activity context for the transition pair is conducive to performing a calibration. The server 102 determines the activity context based on the transition pair, the time relationship and the position relationship. In other words, the server 102 determines whether the time relationship and the position relationship for the transition pair indicate that the activity context of the mobile device for the timepoint of the opportunity to calibrate the barometric pressure sensor 112 is conducive to calibration. Examples of transition pairs, time relationships, position relationships, and recommended conclusions for whether the activity contexts associated therewith are conducive to calibration are provided with respect to FIGS. 4-8, described below. An advantage of systems and methods of the present invention is that by incorporating sequential activity, time and position data, the server 102 can identify user behavior that extends beyond the simple snapshot of activity provided by the activity data from the mobile device 104 or calculated from position and movement sensor data. In addition, the server 102 can flag an activity and/or position that may be unreliable or an activity that may be unfavorable for calibration.

If the activity context is determined (at 318) to be conducive to calibration, then the server 102 performs (at 320) one or more calibration techniques that are enabled by the data in the data packets 122 and generates one or more calibration results therefor. If the activity context is determined (at 318) not to be conducive to calibration, then the server 102 does not perform (at 322) any calibration technique. In some optional embodiments, on the other hand, the server 102 performs the one or more enabled calibration techniques at both 320 and 322; however, the server 102 weights the generated calibration result more heavily at 320 and less heavily at 322. In this case, if the server 102 uses more than one calibration result generated at different times to determine the current calibration value 130 for the mobile device 104, then the calibration result generated at 320 when the activity context is conducive to calibration is weighted more heavily with respect to other calibration results, and the calibration result generated at 322 when the activity context is not conducive to calibration is weighted less heavily with respect to other calibration results.

At 324, the server 102 returns a result (e.g., to an overall control program for the calibration system 100) that includes one or more calibration results (optionally with a weighting value or an indication of whether the activity context was conducive to calibration) or an indication that no calibration technique was performed. Additionally, if a calibration value was determined, then the server 102 sends it to the mobile device 104 for calibrating the barometric pressure sensor 112.

FIG. 4 shows a simplified table of rules (rules table 400) for determining whether an activity context is conducive to calibrating the barometric pressure sensor 112 in the mobile device 104, in accordance with some embodiments. Examples of activity transition pairs are given in the first column. A relative time difference (e.g., small or large time) for the time relationship is given in the second column. A relative position difference (e.g., small or large distance) for the position relationship is given in the third column. A wholistic or contextual interpretation of the activity context for the most likely activity of the mobile device 104 between the two activity transitions of the transition pair (based on the time relationship and the position relationship for the transition pair) is given in the fourth column. The conclusion of whether the activity context is conducive to calibration (based on the wholistic or contextual interpretation in the fourth column) is given in the fifth column.

The designation of the time difference as being either "small" or "large' is generally based on an empirically determined time threshold that has been determined to be a reliable metric for interpreting the activity contexts. In some embodiments, the time threshold is about 5 minutes, so that a time difference less than 5 mins is "small" and a time difference greater than or equal to 5 mins is "large". Other empirically determined values for the time threshold may also be used. In some embodiments, a different time threshold is used for different transition pairs.

Similarly, the designation of the position difference as being either "small" or "large' is generally based on an empirically determined distance threshold that has been determined to be a reliable metric for interpreting the activity contexts. In some embodiments, the distance threshold is about 100 m, so that a position difference less than 100 m is "small" and a position difference greater than or equal to 100 m is "large". Other empirically determined values for the distance threshold may also be used. In some embodiments, a different distance threshold is used for different transition pairs. In some embodiments, the distance threshold is a function of the morphology of the environment (e.g., urban, suburban, or rural), so that a shorter distance threshold is provided for a morphology with a high degree of altitude variability (e.g., an urban morphology environment having many tall buildings), and a longer distance threshold is provided for a morphology with a low degree of altitude variability (e.g., a suburban morphology environment having only short buildings or a rural morphology environment having almost no buildings). Additionally, the distance threshold can be different for different urban environments, e.g., with a smaller distance threshold being appropriate for an environment with many, densely positioned, and very tall buildings (e.g., New York City), and a longer distance threshold being appropriate for an environment with only moderately tall buildings (e.g., San Jose, CA).

In an example, when the time difference is less than the time threshold (small) and the position difference is less than the distance threshold (small), a first wholistic interpretation of the activity context is that the user of the mobile device 104 was most likely engaged in a first overall activity. In another example, when the time difference is greater than or equal to the time threshold (large) and the position difference is less than the distance threshold (small), a second wholistic interpretation of the activity context is that the user of the mobile device 104 was most likely engaged in a second overall activity. In another example, when the time difference is less than the time threshold (small) and the position difference is greater than or equal to the distance threshold (large), a third wholistic interpretation of the activity context is that the user of the mobile device 104 was most likely engaged in a third overall activity. In another example, when the time difference is greater than or equal to the time threshold (large) and the position difference is greater than or equal to the distance threshold (large), a fourth wholistic interpretation of the activity context is that the user of the mobile device 104 was most likely engaged in a fourth overall activity.

The wholistic interpretation indicates, not just that the mobile device 104 was being still, for example, in the middle of a DS to SD transition pair, but what the user might have actually been doing during the time period between the transitions. In some situations, however, there may not be a reliable interpretation of the activity context.

The conclusion for whether the activity context is conducive to calibration (based on the time relationship and the position relationship for the transition pair) generally relies on the wholistic interpretation of the activity context. In particular, if the most likely overall activity of the user and the mobile device 104, as illustrated by the fourth column of the rules table 400, is empirically considered to be conducive to a good calibration result, then the conclusion is that the time relationship and the position relationship for the transition pair indicate that the activity context of the mobile device 104 for the timepoint (between the two activity transitions) of the opportunity to calibrate the barometric pressure sensor is conducive to calibration. On the other hand, if the most likely overall activity of the user and the mobile device 104 is empirically considered not to be conducive to a good calibration result, then the conclusion is that the time relationship and the position relationship for the transition pair indicate that the activity context of the mobile device 104 for the timepoint (between the two activity transitions) of the opportunity to calibrate the barometric pressure sensor is not conducive to calibration.

Figure 5:
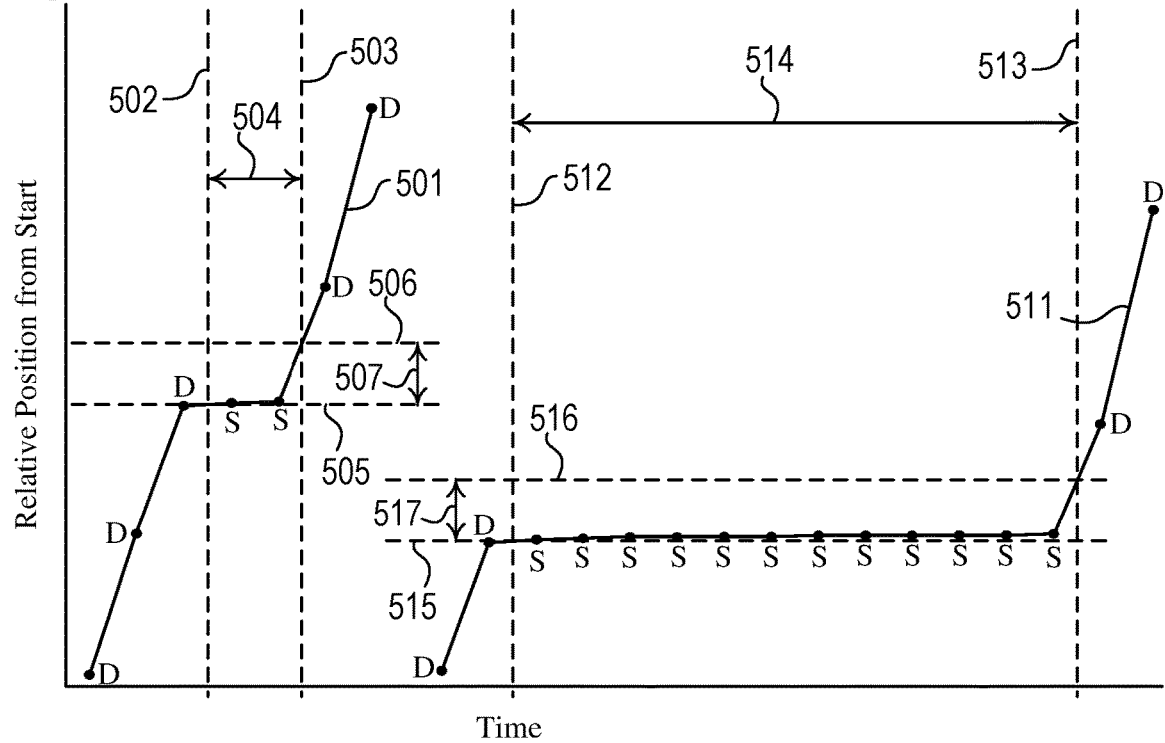
FIGS. 5-8 show simplified graphs illustrating activity transition pairs for use in determining whether an activity context is conducive to calibrating a barometric pressure sensor in a mobile device, in accordance with some embodiments.

In an example shown by the rules table 400 for the DS to SD transition pair, when the time difference is small and the position difference is small, the most likely interpretation of this situation is that the user and mobile device 104 are travelling in a vehicle, but are momentarily stopped in traffic, such as at a traffic light or in very heavy traffic. This situation, therefore, typically has the problems associated with vehicle driving that can result in unreliable measurements from the mobile device 104, such as variations in the pressure measurement caused by the vehicle's HVAC system, so this situation is often not conducive to calibration. Of course, it is possible that the user exited the vehicle without going anywhere for the short period of time, which would typically be a situation that is conducive to calibration, but this is a much less likely interpretation of the activity context, and might mean that the activity in the middle was something other than "still". In this example, therefore, the server 102 determines that the activity context of the mobile device 104 for the timepoint of the opportunity to calibrate the barometric pressure sensor 112 is not conducive to calibration in response to determining 1) the first activity transition is from a first driving activity to a still activity (i.e., a DS transition), 2) the second activity transition is from the still activity to a second driving activity (i.e., an SD transition), 3) the time relationship indicates that the time difference between the first activity transition and the second activity transition is less than the time threshold (small time difference), and 4) the position relationship indicates that the position difference between the first activity transition and the second activity transition is less than the distance threshold (small distance difference). This example is illustrated in FIG. 5, which shows a simplified graph 501 of relative position from start vs. time for the first driving activity (three "D" dots on the left with large relative position changes from the start point), the still activity (two "S" dots in the middle with almost no relative position changes), and the second driving activity (two "D" dots on the right). The DS activity transition is assumed to occur at the midpoint between the last D on the left and the first S in the middle, indicated as a vertical dashed line 502. The SD activity transition is assumed to occur at the midpoint between the last S in the middle and the first D on the right, indicated as a vertical dashed line 503. The vertical dashed lines 502 and 503, therefore, indicate that the time difference 504 between the DS activity transition and the SD activity transition is relatively small (i.e., less than the time threshold). Additionally, horizontal dashed lines 505 and 506 indicate that the position difference 507 between the DS activity transition and the SD activity transition is relatively small (i.e., less than the distance threshold).

In another example shown by the rules table 400 for the DS to SD transition pair, when the time difference is large and the position difference is small, the most likely interpretation of this situation is that the user has parked the vehicle, even though the user and mobile device 104 did not move very far from the vehicle while parked. This situation, therefore, typically does not have the problems associated with travelling in a vehicle that can result in unreliable measurements, because if the vehicle is parked, then it is assumed that the user is getting out of the vehicle and the pressure is equalizing with the exterior. Since the pressure is likely equalizing with the exterior, this situation is often conducive to calibration. Additionally, it is possible that the user exited the vehicle without going anywhere for the large period of time, which is also consistent with having parked the vehicle, so this would typically be a situation that is conducive to calibration. In this example, therefore, the server 102 determines that the activity context of the mobile device 104 for the timepoint of the opportunity to calibrate the barometric pressure sensor 112 is conducive to calibration in response to determining 1) the first activity transition is from a first driving activity to a still activity (i.e., a DS transition), 2) the second activity transition is from the still activity to a second driving activity (i.e., an SD transition), 3) the time relationship indicates that the time difference between the first activity transition and the second activity transition is greater than (or equal to) the time threshold (large time difference), and 4) the position relationship indicates that the position difference between the first activity transition and the second activity transition is less than the distance threshold (small distance difference). This example is illustrated in FIG. 5, which shows a simplified graph 511 of relative position from start vs. time for the first driving activity (two "D" dots on the left), the still activity (twelve "S" dots in the middle), and the second driving activity (two "D" dots on the right). The DS activity transition is assumed to occur at the midpoint between the last D on the left and the first S in the middle. The SD activity transition is assumed to occur at the midpoint between the last S in the middle and the first D on the right. Vertical dashed lines 512 and 513, therefore, indicate that the time difference 514 between the DS activity transition and the SD activity transition is relatively large (i.e., greater than or equal to the time threshold). Additionally, horizontal dashed lines 515 and 516 indicate that the position difference 517 between the DS activity transition and the SD activity transition is relatively small (i.e., less than the distance threshold).

Figure 6:
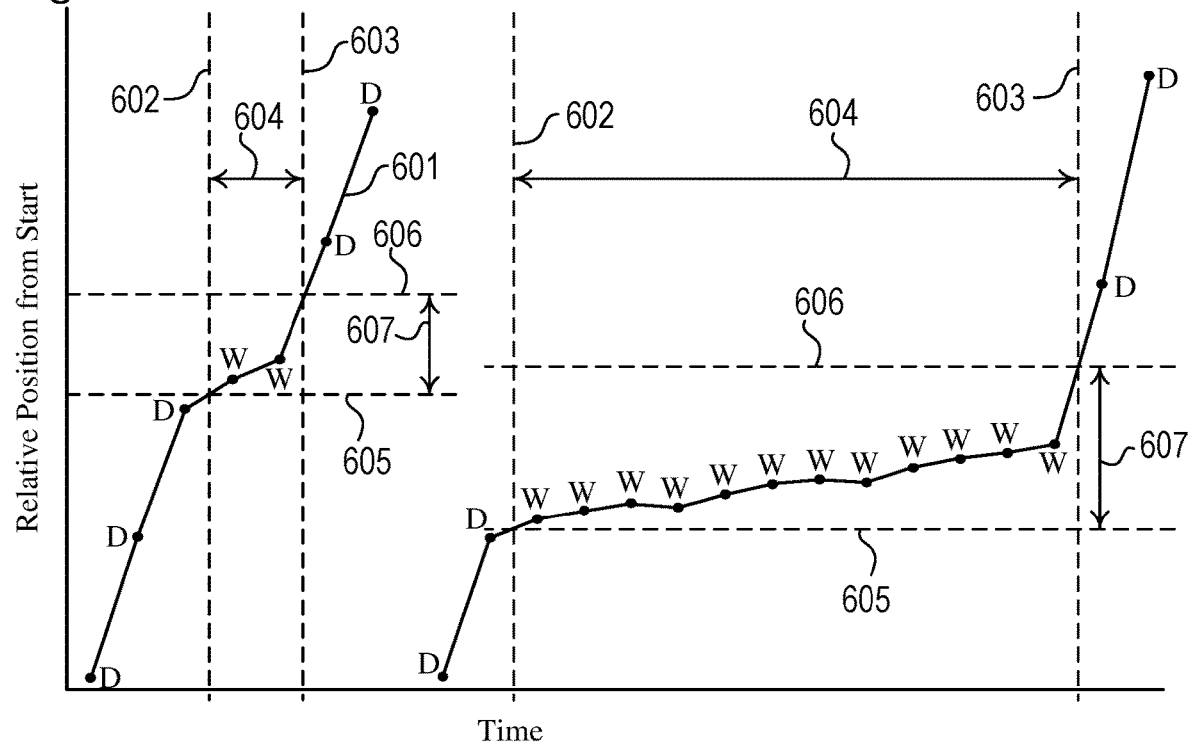

In another example shown by the rules table 400 for the DW to WD transition pair, when the time difference is small and the position difference is small, the most likely interpretation of this situation is that the user and mobile device 104 are travelling in a vehicle in slow traffic, rather than the less likely interpretation that the user exited the vehicle and walked around for a short period of time. This situation, therefore, typically has the problems associated with vehicle driving that can result in unreliable measurements by the mobile device 104, so this situation is often not conducive to calibration. In this example, therefore, the server 102 determines that the activity context of the mobile device 104 for the timepoint of the opportunity to calibrate the barometric pressure sensor 112 is not conducive to calibration in response to determining 1) the first activity transition is from a first driving activity to a walking activity (i.e., a DW transition), 2) the second activity transition is from the walking activity to a second driving activity (i.e., a WD transition), 3) the time relationship indicates that the time difference between the first activity transition and the second activity transition is less than the time threshold (small time difference), and 4) the position relationship indicates that the position difference between the first activity transition and the second activity transition is less than the distance threshold (small distance difference). This example is illustrated in FIG. 6, which shows a simplified graph 601 of relative position from start vs. time for the first driving activity (three "D" dots on the left), the walking activity (two "W" dots in the middle with small, nonzero relative position changes from the start point), and the second driving activity (two "D" dots on the right). The DW activity transition is assumed to occur at the midpoint between the last D on the left and the first W in the middle. The WD activity transition is assumed to occur at the midpoint between the last W in the middle and the first D on the right. Vertical dashed lines 602 and 603, therefore, indicate that the time difference 604 between the DW activity transition and the WD activity transition is relatively small (i.e., less than the time threshold). Additionally, horizontal dashed lines 605 and 606 indicate that the position difference 607 between the DW activity transition and the WD activity transition is relatively small (i.e., less than the distance threshold, albeit greater than position difference 507).

In another example shown by the rules table 400 for the DW to WD transition pair, when the time difference is large and the position difference is small, the most likely interpretation of this situation is either that the user parked the vehicle and walked around or was looking for parking before returning to driving. In this situation, the interpretation is fairly equally likely to be either that the user was indeed walking around or that the user was slowly driving, so either conclusion for conducive or not conducive for calibration is likely. Therefore, in different embodiments, either conclusion can potentially be used in the systems and methods herein, and with more information, it might be possible to more definitively determine whether this situation is conducive to calibration. However, to be safe and to avoid a poor calibration result, it may be preferable in some embodiments to conclude that this situation is not conducive to calibration. In some embodiments of this example, therefore, the server 102 determines that the activity context of the mobile device 104 for the timepoint of the opportunity to calibrate the barometric pressure sensor 112 is not conducive to calibration in response to determining 1) the first activity transition is from a first driving activity to a walking activity (i.e., a DW transition), 2) the second activity transition is from the walking activity to a second driving activity (i.e., a WD transition), 3) the time relationship indicates that the time difference between the first activity transition and the second activity transition is greater than or equal to the time threshold (large time difference), and 4) the position relationship indicates that the position difference between the first activity transition and the second activity transition is less than the distance threshold (small distance difference). In other embodiments of this example, on the other hand, the server 102 determines that the activity context of the mobile device 104 for the timepoint of the opportunity to calibrate the barometric pressure sensor 112 is conducive to calibration in response to determining the same factors. This example is illustrated in FIG. 6, which shows a simplified graph 601 of relative position from start vs. time for the first driving activity (three "D" dots on the left), the walking activity (two "W" dots in the middle), and the second driving activity (two "D" dots on the right). The DW activity transition is assumed to occur at the midpoint between the last D on the left and the first W in the middle. The WD activity transition is assumed to occur at the midpoint between the last W in the middle and the first D on the right. Vertical dashed lines 602 and 603, therefore, indicate that the time difference 604 between the DW activity transition and the WD activity transition is relatively small (i.e., less than the time threshold). Additionally, horizontal dashed lines 605 and 606 indicate that the position difference 607 between the DW activity transition and the WD activity transition is relatively small (i.e., less than the distance threshold, albeit greater than position difference 507).

Figure 7:
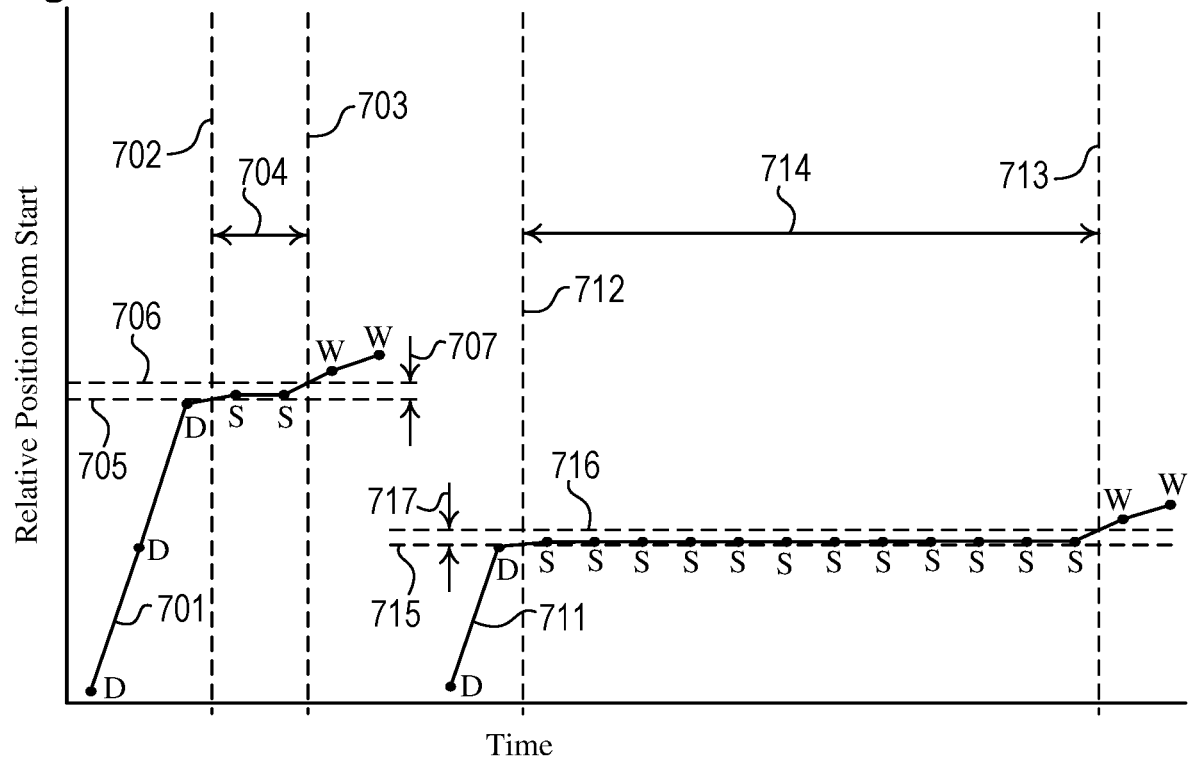

In another example shown by the rules table 400 for the DS to SW transition pair, when the time difference is small and the position difference is small, the most likely interpretation of this situation is that the user has arrived after driving to a destination and is now walking around. Similarly, when the time difference is large and the position difference is small, the most likely interpretation of this situation is that the user has parked the vehicle and is now walking around. Both of these situations typically do not have the problems associated with travelling in a vehicle that can result in unreliable measurements, so these situations are often conducive to calibration. In this example, therefore, the server 102 determines that the activity context of the mobile device 104 for the timepoint of the opportunity to calibrate the barometric pressure sensor 112 is conducive to calibration in response to determining 1) the first activity transition is from a driving activity to a still activity (i.e., a DS transition), 2) the second activity transition is from the still activity to a walking activity (i.e., an SW transition), 3) the time relationship indicates that the time difference between the first activity transition and the second activity transition is either less than or greater than (or equal to) the time threshold (small or large time difference, or the server 102 does not consider the time difference), and 4) the position relationship indicates that the position difference between the first activity transition and the second activity transition is less than the distance threshold (small distance difference). This example is illustrated in FIG. 7, which shows simplified graphs 701 and 711 of relative position from start vs. time for the DS to SW transition pair. Graph 701 shows the driving activity (three "D" dots on the left), the still activity (two "S" dots in the middle), and the walking activity (two "W" dots on the right). Graph 711 shows the driving activity (two "D" dots on the left), the still activity (twelve "S" dots in the middle), and the walking activity (two "W" dots on the right). In both graphs 701 and 711, the DS activity transition is assumed to occur at the midpoint between the last D on the left and the first S in the middle, and the SW activity transition is assumed to occur at the midpoint between the last S in the middle and the first W on the right. Vertical dashed lines 702 and 703 indicate that the time difference 704 between the DS activity transition and the SW activity transition is relatively small (i.e., less than the time threshold), and vertical dashed lines 712 and 713 indicate that the time difference 714 between the DS activity transition and the SW activity transition is relatively large (i.e., greater than or equal to the time threshold). Additionally, horizontal dashed lines 705 and 706 indicate that the position difference 707 between the DS activity transition and the SW activity transition is relatively small (i.e., less than the distance threshold), and horizontal dashed lines 715 and 716 indicate that the position difference 717 between the DS activity transition and the SW activity transition is relatively small (i.e., less than the distance threshold).

Figure 8:
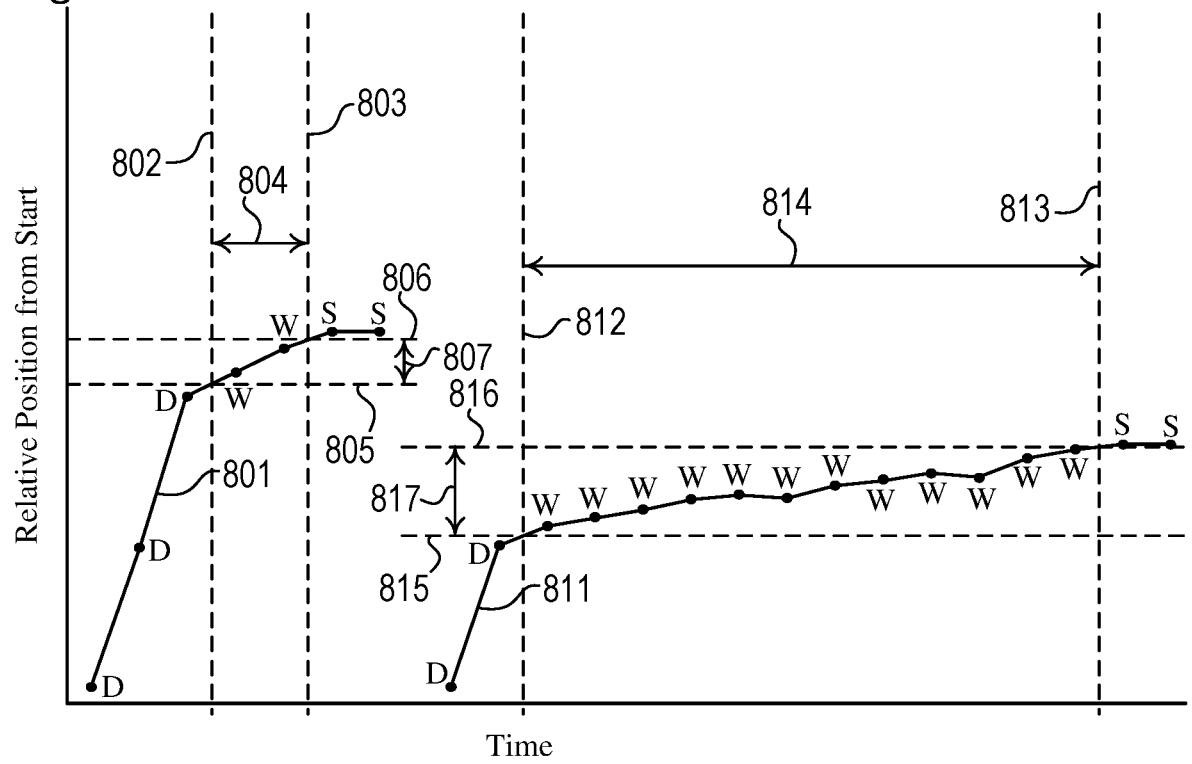

In another example shown by the rules table 400 for the DW to WS transition pair, when the time difference is small and the position difference is small, the most likely interpretation of this situation is either that the user parked the vehicle or the user was driving around slowly while looking for parking. In this situation, either interpretation is fairly equally likely, so either conclusion for conducive or not conducive for calibration is appropriate. Therefore, in different embodiments, either conclusion can potentially be used in the systems and methods herein, and with more information, it might be possible to more definitively determine whether this situation is conducive to calibration. However, to be safe and to avoid a poor calibration result, it may be preferable in some embodiments to conclude that this situation is not conducive to calibration. In some embodiments of this example, therefore, the server 102 determines that the activity context of the mobile device 104 for the timepoint of the opportunity to calibrate the barometric pressure sensor 112 is not conducive to calibration in response to determining 1) the first activity transition is from a driving activity to a walking activity (i.e., a DW transition), 2) the second activity transition is from the walking activity to a still activity (i.e., a WS transition), 3) the time relationship indicates that the time difference between the first activity transition and the second activity transition is less than the time threshold (small time difference), and 4) the position relationship indicates that the position difference between the first activity transition and the second activity transition is less than the distance threshold (small distance difference). In other embodiments of this example, on the other hand, the server 102 determines that the activity context of the mobile device 104 for the timepoint of the opportunity to calibrate the barometric pressure sensor 112 is conducive to calibration in response to determining the same factors. This example is illustrated in FIG. 8, which shows a simplified graph 801 of relative position from start vs. time for the driving activity (three "D" dots on the left), the walking activity (two "W" dots in the middle), and the still activity (two "S" dots on the right). The DW activity transition is assumed to occur at the midpoint between the last D on the left and the first W in the middle. The WS activity transition is assumed to occur at the midpoint between the last W in the middle and the first S on the right. Vertical dashed lines 802 and 803, therefore, indicate that the time difference 804 between the DW activity transition and the WS activity transition is relatively small (i.e., less than the time threshold). Additionally, horizontal dashed lines 805 and 806 indicate that the position difference 807 between the DW activity transition and the WS activity transition is relatively small (i.e., less than the distance threshold).

In another example shown by the rules table 400 for the DW to WS transition pair, when the time difference is large and the position difference is small, the most likely interpretation of this situation is that the user is driving slowly while looking for parking. In this situation, since the vehicle is being driven, the conclusion for the activity context being not conducive for calibration is appropriate. In some embodiments of this example, therefore, the server 102 determines that the activity context of the mobile device 104 for the timepoint of the opportunity to calibrate the barometric pressure sensor 112 is not conducive to calibration in response to determining 1) the first activity transition is from a driving activity to a walking activity (i.e., a DW transition), 2) the second activity transition is from the walking activity to a still activity (i.e., a WS transition), 3) the time relationship indicates that the time difference between the first activity transition and the second activity transition is greater than or equal to the time threshold (large time difference), and 4) the position relationship indicates that the position difference between the first activity transition and the second activity transition is less than the distance threshold (small distance difference). This example is illustrated in FIG. 8, which shows a simplified graph 811 of relative position from start vs. time for the driving activity (two "D" dots on the left), the walking activity (twelve "W" dots in the middle), and the still activity (two "S" dots on the right). The DW activity transition is assumed to occur at the midpoint between the last D on the left and the first W in the middle. The WS activity transition is assumed to occur at the midpoint between the last W in the middle and the first S on the right. Vertical dashed lines 812 and 813, therefore, indicate that the time difference 814 between the DW activity transition and the WS activity transition is relatively large (i.e., greater than or equal to the time threshold). Additionally, horizontal dashed lines 815 and 816 indicate that the position difference 817 between the DW activity transition and the WS activity transition is relatively small (i.e., less than the distance threshold).

In another example shown by the rules table 400 for the DS to SD, DW to WD, DS to SW, and DW to WS transition pairs, when the time difference is small and the position difference is large, the most likely interpretation of this situation is that an error has occurred in the activity data or position data, because a large position difference is typically impossible when the user is supposed to be either still or walking within a small time difference. In this situation, since the position data and/or the activity data is unreliable, the conclusion is that the activity context is not conducive for calibration. In some embodiments of this example, therefore, the server 102 determines that the activity context of the mobile device 104 for the timepoint of the opportunity to calibrate the barometric pressure sensor 112 is not conducive to calibration in response to determining 1) the transition pair is DS to SD, DW to WD, DS to SW, or DW to WS, 2) the time relationship indicates that the time difference between the first activity transition and the second activity transition is less than the time threshold (small time difference), and 3) the position relationship indicates that the position difference between the first activity transition and the second activity transition is greater than or equal to the distance threshold (large distance difference).

In another example shown by the rules table 400 for the SD to DS, WD to DW, SD to DW, and WD to DS transition pairs, regardless of the time difference or the position difference, the conclusion is that the activity context is not conducive to calibration. This is because the activity at the time the calibration opportunity occurred is a driving activity, and driving is typically not conducive to calibration, as mentioned above. Additionally, the interpretation of the activity context generally supports the determination that the activity between the transition pairs is indeed a driving activity. For example, for each of these transition pairs, when the time difference and the position difference are both small, the interpretation of the activity context is that the user started driving but soon stopped driving. In another example, when the time difference is large and the position difference is small, the interpretation of the activity context is that the user is probably driving in circles, e.g., making loops around a building structure. In another example, when the time difference is small and the position difference is large, the interpretation of the activity context is that the user is simply driving.

In another example shown by the rules table 400 for all of the transition pairs displayed (i.e., DS to SD, DW to WD, DS to SW, DW to WS, SD to DS, WD to DW, SD to DW, and WD to DS), when the time difference is large and the position difference is large, there is no conclusion to draw for the interpretation of the activity context, because the available data is too sparse. In other words, the two transitions of the transition pair occurred too far apart in time and distance to be able to reliably determine the wholistic activity of the user and the mobile device 104.

In another example shown by the rules table 400 for the SW to WS and WS to SW transition pairs, regardless of the time difference or the position difference, the conclusion is that the activity context is conducive to calibration. This is because the activity context, and specifically the activity at the time the calibration opportunity occurred, does not include driving. As mentioned above, driving or riding in a vehicle is unsuitable for calibration, so all of the previously mentioned transition pairs focus on those that include at least one driving activity. However, transition pairs that do not include a driving activity are generally conducive to calibration.

It is understood that the most likely overall activity of the user and the mobile device 104, as illustrated by the fourth column of the rules table 400, is not the only possible interpretation of the activity context. Other situations could possibly occur for each of the examples shown, and some of those situations could be conducive to calibration and some not. However, since it is generally not necessary to calibrate the barometric pressure sensor 112 very often (e.g., not more often than once every day or two), it is considered acceptable to skip calibration opportunities when it is uncertain whether the situation is properly conducive to calibration. Thus, the systems and methods herein err on the side of not performing a calibration unless there is greater certainty that the situation is conducive to calibration. Performing a calibration under poor conditions could throw off the calibration of the barometric pressure sensor, so it is considered better practice to wait for better calibration opportunities, which typically occur often enough to be acceptable. Of course, if the mobile device 104 goes too long, e.g., several days, without a new calibration for its barometric pressure sensor 112, then the server 102 may override a determination that an activity context is not conducive to calibration and go ahead and perform a calibration under less-than-optimal conditions.

Additionally, although the previously mentioned transition pairs include only the driving activity, the walking activity, and the still activity, it is understood that other activities can also be included in other transition pairs. From the activity context, it may be possible to empirically determine a most likely activity between the two activity transitions and a conclusion for whether the activity context is conducive to calibration.

Any method, technique, process, approach or computation described or otherwise enabled by disclosure herein may be implemented by hardware components (e.g., machines), software modules (e.g., stored in machine-readable media), or a combination thereof. In particular, any method or technique described or otherwise enabled by disclosure herein may be implemented by any concrete and tangible system described herein. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media, including but not limited to one or more non-volatile or volatile storage media, removable or non-removable media, integrated circuit media, magnetic storage media, optical storage media, or any other storage media, including RAM, ROM, and EEPROM, that may be patented under the laws of the jurisdiction in which this application is filed, but does not include machine-readable media that cannot be patented under the laws of the jurisdiction in which this application is filed (e.g., transitory propagating signals). Methods disclosed herein provide sets of rules that are performed. Systems that include one or more machines and one or more non-transitory machine-readable media for implementing any method described herein are also contemplated herein. One or more machines that perform or implement, or are configured, operable or adapted to perform or implement operations comprising the steps of any methods described herein are also contemplated herein. Each method described herein that is not prior art represents a specific set of rules in a process flow that provides significant advantages in the fields of calibration and position location. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

An environment in which processes described herein may operate may include a network of terrestrial transmitters, at least one mobile device (e.g., user device), and a server. Each of the transmitters and the mobile device may be located at different altitudes or depths that are inside or outside various natural or manmade structures (e.g. buildings). Location or positioning signals may be respectively transmitted from the transmitters and satellites, and subsequently received by the mobile device using known transmission technologies. For example, the transmitters may transmit the signals using one or more common multiplexing parameters that utilize time slots, pseudorandom sequences, frequency offsets, or other approaches, as is known in the art or otherwise disclosed herein. The mobile device may take different forms, including a mobile phone or other wireless communication device, a portable computer, a navigation device, a tracking device, a receiver, or another suitable device that can receive the signals. Each transmitter and mobile device may include atmospheric sensors (e.g., a pressure and temperature sensors) for generating measurements of atmospheric conditions (e.g., pressure and temperature) that are used to estimate an unknown altitude of the mobile device. By way of example, a pressure sensor of the mobile device may also be calibrated from time to time.

By way of example in FIG. 9, transmitters 202 discussed herein may include: a mobile device interface 11 for exchanging information with a mobile device 104 (e.g., antenna(s) and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, humidity, other) at or near the transmitter 202; a server interface 15 for exchanging information with a server 102 (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter 202; (ii) generation of positioning signals for transmission using a selected time, frequency, code, and/or phase; (iii) processing of signaling received from the mobile device 104 or other source; or (iv) other processing as required by operations described in this disclosure. Signals 210 generated and transmitted by the transmitter 202 may carry different information that, once determined by the mobile device 104 or the server 102, may identify the following: the transmitter 202; the transmitter's position; environmental conditions at or near the transmitter 202; and/or other information known in the art. The atmospheric sensor(s) 14 may be integral with the transmitter 202, or separate from the transmitter 202 and either co-located with the transmitter 202 or located in the vicinity of the transmitter 202 (e.g., within a threshold amount of distance).

By way of example in FIG. 9, the mobile device 104 may include a network interface 27 for exchanging information with the server 102 via the network 106 (e.g., a wired and/or a wireless interface port, an antenna and RF front end components known in the art or otherwise disclosed herein); one or more processor(s) 22; memory/data source 23 for providing storage and retrieval of information and/or program instructions; atmospheric sensor(s) 24 (including the barometric pressure sensor 112) for measuring environmental conditions (e.g., pressure, temperature, other) at the mobile device 104; other sensor(s) 25 for measuring other conditions (e.g., compass, accelerometer and inertial sensors for measuring movement and orientation); a user interface 26 (e.g., display, keyboard, microphone, speaker, other) for permitting the user of the mobile device 104 to provide inputs and receive outputs; and any other components known to one of ordinary skill in the art. A GNSS interface and processing unit (not shown) are contemplated, which may be integrated with other components or a standalone antenna, RF front end, and processors dedicated to receiving and processing GNSS signaling. The memory/data source 23 may include memory storing data and software modules with executable instructions, including a signal processing module, a signal-based position estimate module, a pressure-based altitude module, a movement determination module, the current calibration value, the data packet, a calibration module, and other modules. The processor(s) 22 may perform different actions by executing the instructions from the modules, including: (i) performance of part or all of the methods, processes and techniques as described herein or otherwise understood by one of ordinary skill in the art as being performable at the mobile device 104; (ii) estimation of an altitude of the mobile device 104 (based on measurements of pressure from the mobile device 104 and transmitter(s) 202, temperature measurement(s) from the transmitter(s) 202 or another source, and any other information needed for the computation); (iii) processing of received signals to determine position information or location data (e.g., times of arrival or travel time of the signals, pseudoranges between the mobile device 104 and transmitters 202, transmitter atmospheric conditions, transmitter and/or locations or other transmitter information); (iv) use of position information to compute an estimated position of the mobile device 104; (v) determination of movement based on measurements from inertial sensors of the mobile device 104; (vi) GNSS signal processing; (vii) assembling and transmitting the data packet 118; (viii) storing the current calibration value 116 and the data packet 118; (ix) calibrating the barometric pressure sensor 112; and/or (x) other processing as required by operations described in this disclosure.

By way of example in FIG. 9, the server 102 may include: a network interface 31 for exchanging information with the mobile device 104 and other sources of data via the network 106 (e.g., a wired and/or a wireless interface port, an antenna, or other); one or more processor(s) 32; memory/data source 33 for providing storage and retrieval of information and/or program instructions; and any other components known to one of ordinary skill in the art. The memory/data source 33 may include memory storing software modules with executable instructions, such as calibration technique modules, a signal-based positioning module, a pressure-based altitude module, a calibration conduciveness module, as well as other modules for each of the above described methods and processes or portions/steps thereof. The processor(s) 32 may perform different actions by executing instructions from the modules, including: (i) performance of part or all of the methods, processes and techniques as described herein or otherwise understood by one of ordinary skill in the art as being performable at the server 102; (ii) estimation of an altitude of the mobile device 104; (iii) computation of an estimated position of the mobile device 104; (iv) performance of calibration techniques; (v) calibration of the mobile device 104; (vi) determination of calibration conduciveness for a calibration opportunity; or (vii) other processing as required by operations or processes described in this disclosure. Steps performed by servers 102 as described herein may also be performed on other machines that are remote from the mobile device 104, including computers of enterprises or any other suitable machine.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
   receiving, by a server from a mobile device, a plurality of data packets;
   determining, by the server, a first activity, a second activity, and a third activity of the mobile device based on the plurality of data packets;
   determining, by the server, a first activity transition of the mobile device based on the first activity and the second activity;
   determining, by the server, a second activity transition of the mobile device based on the second activity and the third activity;
   determining, by the server, a transition pair based on the first activity transition and the second activity transition;
   determining, by the server, a time relationship and a position relationship for the transition pair between the first activity transition and the second activity transition;
   determining, by the server, that an opportunity to calibrate a barometric pressure sensor of the mobile device has occurred at a timepoint between the first activity transition and the second activity transition based on the plurality of data packets;
   performing, by the server, a calibration of the barometric pressure sensor in response to determining that the time relationship and the position relationship for the transition pair indicate that an activity context of the mobile device for the timepoint of the opportunity to calibrate the barometric pressure sensor is conducive to calibration;
   not performing the calibration of the barometric pressure sensor in response to determining, by the server, that the time relationship and the position relationship for the transition pair indicate that the activity context of the mobile device for the timepoint of the opportunity to calibrate the barometric pressure sensor is not conducive to calibration; and
   transmitting, by the server to the mobile device, a current calibration value in response to performing the calibration; and
   calibrating the barometric pressure sensor using the current calibration value in response to receiving the current calibration value by the mobile device.

2. The method of claim 1, further comprising:
   determining, by the server, that the activity context of the mobile device for the timepoint of the opportunity to calibrate the barometric pressure sensor is not conducive to calibration in response to determining 1) the first activity transition is from a first driving activity to a still activity, 2) the second activity transition is from the still activity to a second driving activity, and 3) the time relationship indicates that a time difference between the first activity transition and the second activity transition is less than a time threshold.

3. The method of claim 1, further comprising:
determining, by the server, that the activity context of the mobile device for the timepoint of the opportunity to calibrate the barometric pressure sensor is conducive to calibration in response to determining 1) the first activity transition is from a first driving activity to a still activity, 2) the second activity transition is from the still activity to a second driving activity, 3) the time relationship indicates that a time difference between the first activity transition and the second activity transition is greater than a time threshold, and 4) the position relationship indicates that a position difference between the first activity transition and the second activity transition is less than a distance threshold.

4. The method of claim 1, further comprising:
determining, by the server, that the activity context of the mobile device for the timepoint of the opportunity to calibrate the barometric pressure sensor is not conducive to calibration in response to determining 1) the first activity transition is from a first driving activity to a walking activity, 2) the second activity transition is from the walking activity to a second driving activity, and 3) the time relationship indicates that a time difference between the first activity transition and the second activity transition is less than a time threshold.

5. The method of claim 1, further comprising:
determining, by the server, that the activity context of the mobile device for the timepoint of the opportunity to calibrate the barometric pressure sensor is conducive to calibration in response to determining 1) the first activity transition is from a first driving activity to a walking activity, 2) the second activity transition is from the walking activity to a second driving activity, 3) the time relationship indicates that a time difference between the first activity transition and the second activity transition is greater than a time threshold, and 4) the position relationship indicates that a position difference between the first activity transition and the second activity transition is less than a distance threshold.

6. The method of claim 1, further comprising:
determining, by the server, that the activity context of the mobile device for the timepoint of the opportunity to calibrate the barometric pressure sensor is not conducive to calibration in response to determining 1) the first activity transition is from a first driving activity to a walking activity, 2) the second activity transition is from the walking activity to a second driving activity, 3) the time relationship indicates that a time difference between the first activity transition and the second activity transition is greater than a time threshold, and 4) the position relationship indicates that a position difference between the first activity transition and the second activity transition is less than a distance threshold.

7. The method of claim 1, further comprising:
determining, by the server, that the activity context of the mobile device for the timepoint of the opportunity to calibrate the barometric pressure sensor is conducive to calibration in response to determining 1) the first activity transition is from a driving activity to a still activity, 2) the second activity transition is from the still activity to a walking activity, and 3) the position relationship indicates that a position difference between the first activity transition and the second activity transition is less than a distance threshold.

8. The method of claim 1, further comprising:
determining, by the server, that the activity context of the mobile device for the timepoint of the opportunity to calibrate the barometric pressure sensor is not conducive to calibration in response to determining 1) the first activity transition is from a driving activity to a still activity, 2) the second activity transition is from the still activity to a walking activity, and 3) the position relationship indicates that a position difference between the first activity transition and the second activity transition is greater than a distance threshold.

9. The method of claim 1, further comprising:
determining, by the server, that the activity context of the mobile device for the timepoint of the opportunity to calibrate the barometric pressure sensor is conducive to calibration in response to determining 1) the first activity transition is from a driving activity to a walking activity, 2) the second activity transition is from the walking activity to a still activity, 3) the time relationship indicates that a time difference between the first activity transition and the second activity transition is less than a time threshold, and 4) the position relationship indicates that a position difference between the first activity transition and the second activity transition is less than a distance threshold.

10. The method of claim 1, further comprising:
determining, by the server, that the activity context of the mobile device for the timepoint of the opportunity to calibrate the barometric pressure sensor is not conducive to calibration in response to determining 1) the first activity transition is from a driving activity to a walking activity, 2) the second activity transition is from the walking activity to a still activity, 3) the time relationship indicates that a time difference between the first activity transition and the second activity transition is less than a time threshold, and 4) the position relationship indicates that a position difference between the first activity transition and the second activity transition is less than a distance threshold.

11. The method of claim 1, further comprising:
determining, by the server, that the activity context of the mobile device for the timepoint of the opportunity to calibrate the barometric pressure sensor is not conducive to calibration in response to determining 1) the first activity transition is from a driving activity to a walking activity, 2) the second activity transition is from the walking activity to a still activity, 3) the time relationship indicates that a time difference between the first activity transition and the second activity transition is greater than a time threshold, and 4) the position relationship indicates that a position difference between the first activity transition and the second activity transition is less than a distance threshold.

12. The method of claim 1, further comprising:
determining, by the server, that the activity context of the mobile device for the timepoint of the opportunity to calibrate the barometric pressure sensor is not conducive to calibration in response to determining 1) the first activity transition is from a driving activity to a walking activity, 2) the second activity transition is from the walking activity to a still activity, 3) and the position relationship indicates that a position difference between the first activity transition and the second activity transition is greater than a distance threshold.

13. The method of claim 1, further comprising:
determining, by the server, that the activity context of the mobile device for the timepoint of the opportunity to calibrate the barometric pressure sensor is not conducive to calibration in response to determining 1) the first activity transition is from any first activity to a driving activity, and 2) the second activity transition is from the driving activity to any second activity.

14. The method of claim 1, further comprising:
determining, by the server, that the activity context of the mobile device for the timepoint of the opportunity to calibrate the barometric pressure sensor is not conducive to calibration in response to determining 1) the first activity transition is from any first activity to any second activity, 2) the second activity transition is from the second activity to any third activity, and 3) the position relationship indicates that a position difference between the first activity transition and the second activity transition is greater than a distance threshold.

15. A method comprising:
receiving, by a server from a mobile device, a plurality of data packets;
determining, by the server, a first activity, a second activity, and a third activity of the mobile device based on the plurality of data packets;
determining, by the server, a first activity transition of the mobile device based on the first activity and the second activity;
determining, by the server, a second activity transition of the mobile device based on the second activity and the third activity;
determining, by the server, a transition pair based on the first activity transition and the second activity transition, wherein the transition pair is a driving-to-walking-and-walking-to-driving transition pair, a driving-to-still-and-still-to-walking transition pair, or a driving-to-walking-and-walking-to-still transition pair;
determining, by the server, a time relationship and a position relationship for the transition pair between the first activity transition and the second activity transition;
determining, by the server, that an opportunity to calibrate a barometric pressure sensor of the mobile device has occurred at a timepoint between the first activity transition and the second activity transition based on the plurality of data packets;
performing, by the server, a calibration of the barometric pressure sensor in response to determining that the time relationship and the position relationship for the transition pair indicate that an activity context of the mobile device for the timepoint of the opportunity to calibrate the barometric pressure sensor is conducive to calibration;
not performing the calibration of the barometric pressure sensor in response to determining, by the server, that the time relationship and the position relationship for the transition pair indicate that the activity context of the mobile device for the timepoint of the opportunity to calibrate the barometric pressure sensor is not conducive to calibration; and
transmitting, by the server to the mobile device, a current calibration value in response to performing the calibration; and
calibrating the barometric pressure sensor using the current calibration value in response to receiving the current calibration value by the mobile device.

16. The method of claim 15, further comprising:
determining, by the server, that the activity context of the mobile device for the timepoint of the opportunity to calibrate the barometric pressure sensor is not conducive to calibration in response to determining 1) the first activity transition is from a first driving activity to a walking activity, 2) the second activity transition is from the walking activity to a second driving activity, and 3) the time relationship indicates that a time difference between the first activity transition and the second activity transition is less than a time threshold.

17. The method of claim 15, further comprising:
determining, by the server, that the activity context of the mobile device for the timepoint of the opportunity to calibrate the barometric pressure sensor is conducive to calibration in response to determining 1) the first activity transition is from a first driving activity to a walking activity, 2) the second activity transition is from the walking activity to a second driving activity, 3) the time relationship indicates that a time difference between the first activity transition and the second activity transition is greater than a time threshold, and 4) the position relationship indicates that a position difference between the first activity transition and the second activity transition is less than a distance threshold.

18. The method of claim 15, further comprising:
determining, by the server, that the activity context of the mobile device for the timepoint of the opportunity to calibrate the barometric pressure sensor is not conducive to calibration in response to determining 1) the first activity transition is from a first driving activity to a walking activity, 2) the second activity transition is from the walking activity to a second driving activity, 3) the time relationship indicates that a time difference between the first activity transition and the second activity transition is greater than a time threshold, and 4) the position relationship indicates that a position difference between the first activity transition and the second activity transition is less than a distance threshold.

19. The method of claim 15, further comprising:
determining, by the server, that the activity context of the mobile device for the timepoint of the opportunity to calibrate the barometric pressure sensor is conducive to calibration in response to determining 1) the first activity transition is from a driving activity to a still activity, 2) the second activity transition is from the still activity to a walking activity, and 3) the position relationship indicates that a position difference between the first activity transition and the second activity transition is less than a distance threshold.

20. The method of claim 15, further comprising:
determining, by the server, that the activity context of the mobile device for the timepoint of the opportunity to calibrate the barometric pressure sensor is not conducive to calibration in response to determining 1) the first activity transition is from a driving activity to a still activity, 2) the second activity transition is from the still activity to a walking activity, and 3) the position relationship indicates that a position difference between the first activity transition and the second activity transition is greater than a distance threshold.

21. The method of claim 15, further comprising:
determining, by the server, that the activity context of the mobile device for the timepoint of the opportunity to calibrate the barometric pressure sensor is conducive to calibration in response to determining 1) the first activity transition is from a driving activity to a walking activity, 2) the second activity transition is from the walking activity to a still activity, 3) the time relationship indicates that a time difference between the first activity transition and the second activity transition is less than a time threshold, and 4) the position relationship indicates that a position difference between the first activity transition and the second activity transition is less than a distance threshold.

22. The method of claim 15, further comprising:

determining, by the server, that the activity context of the mobile device for the timepoint of the opportunity to calibrate the barometric pressure sensor is not conducive to calibration in response to determining 1) the first activity transition is from a driving activity to a walking activity, 2) the second activity transition is from the walking activity to a still activity, 3) the time relationship indicates that a time difference between the first activity transition and the second activity transition is less than a time threshold, and 4) the position relationship indicates that a position difference between the first activity transition and the second activity transition is less than a distance threshold.

23. The method of claim 15, further comprising:

determining, by the server, that the activity context of the mobile device for the timepoint of the opportunity to calibrate the barometric pressure sensor is not conducive to calibration in response to determining 1) the first activity transition is from a driving activity to a walking activity, 2) the second activity transition is from the walking activity to a still activity, 3) the time relationship indicates that a time difference between the first activity transition and the second activity transition is greater than a time threshold, and 4) the position relationship indicates that a position difference between the first activity transition and the second activity transition is less than a distance threshold.

24. The method of claim 15, further comprising:

determining, by the server, that the activity context of the mobile device for the timepoint of the opportunity to calibrate the barometric pressure sensor is not conducive to calibration in response to determining 1) the first activity transition is from a driving activity to a walking activity, 2) the second activity transition is from the walking activity to a still activity, 3) and the position relationship indicates that a position difference between the first activity transition and the second activity transition is greater than a distance threshold.

25. The method of claim 15, further comprising:

determining, by the server, that the activity context of the mobile device for the timepoint of the opportunity to calibrate the barometric pressure sensor is not conducive to calibration in response to determining 1) the first activity transition is from any first activity to a driving activity, and 2) the second activity transition is from the driving activity to any second activity.

26. The method of claim 15, further comprising:

determining, by the server, that the activity context of the mobile device for the timepoint of the opportunity to calibrate the barometric pressure sensor is not conducive to calibration in response to determining 1) the first activity transition is from any first activity to any second activity, 2) the second activity transition is from the second activity to any third activity, and 3) the position relationship indicates that a position difference between the first activity transition and the second activity transition is greater than a distance threshold.

* * * * *